United States Patent [19]

Frank et al.

[11] 4,198,140
[45] Apr. 15, 1980

[54] PIEZOELECTRIC CAMERA SHUTTER

[75] Inventors: Lee F. Frank; James K. Lee, both of Rochester, N.Y.

[73] Assignee: Eastman Kodak Company, Rochester, N.Y.

[21] Appl. No.: 942,237

[22] Filed: Sep. 14, 1978

Related U.S. Application Data

[63] Continuation of Ser. No. 816,776, Jul. 18, 1977, abandoned.

[51] Int. Cl.² .............................................. G03B 7/08
[52] U.S. Cl. ..................................... 354/50; 310/331; 354/234
[58] Field of Search ............... 354/50, 60 R, 135, 142, 354/234, 271; 350/161 R, 269; 310/331, 332

[56] References Cited

U.S. PATENT DOCUMENTS

| 3,447,217 | 6/1969 | Kumada | 310/332 X |
|---|---|---|---|
| 3,498,194 | 3/1970 | Bellows | 354/29 |
| 3,500,451 | 3/1970 | Yando | 310/331 X |
| 3,518,930 | 7/1970 | Thieme et al. | 354/71 X |
| 3,553,588 | 1/1971 | Honig | 310/330 X |
| 3,598,030 | 8/1971 | Beach | 354/60 R |
| 3,636,840 | 1/1972 | Harvey et al. | 354/60 R X |

FOREIGN PATENT DOCUMENTS 709977 5/1965 Canada.
1365560 9/1974 United Kingdom.

*Primary Examiner*—Michael L. Gellner
*Attorney, Agent, or Firm*—Warren W. Kurz

[57] ABSTRACT

An exposure control device is disclosed a preferred form of which includes a shutter which is openable to permit scene light to pass through a camera aperture, an electronic circuit for producing a signal which varies with the level of scene illumination, and piezoelectric devices such as bimorphs for providing electrical energy to the circuit when mechanically actuated and for controlling the condition of the shutter in response to the signal from the electronic circuit to automatically establish the exposure period.

5 Claims, 2 Drawing Figures

PIEZOELECTRIC CAMERA SHUTTER

This is a continuation of application Ser. No. 816,776, filed July 18, 1977, now abandoned.

BACKGROUND OF THE INVENTION

1. Field of the Invention

The present invention relates to exposure control devices for use in photographic apparatus, such as still cameras and the like, and more particularly to exposure control devices for automatically establishing exposure in accordance with the level of scene illumination.

2. Description of the Prior Art

In many prior art shutter control devices which include timing circuits for establishing shutter speed, the circuit is energized by a battery contained in the camera. Such mechanisms usually include an electromagnetic transducer adapted to close the shutter after a period of time determined by the timing circuit. Although such arrangements are generally satisfactory, they rely on the availability of sufficient power from the battery. When the battery power is inadequate for operation of such systems, either the shutter operates at a fixed, predetermined speed or it remains open indefinitely, depending on the type of shutter control.

Photographic apparatus such as cameras that employ electric generators for energizing exposure control circuits have been described in the patent literature, such as in U.S. Pat. No. 3,598,030. However, we do not know of any commercial use of such apparatus, which commonly are shown with a spring-driven member to rapidly rotate the generator armature. One possible problem which may have discouraged the use of such generators might be a tendency to cause camera vibration and noise during armature run-down. Also, since the energy conversion of such generators is inefficient, a substantial amount of energy must be stored in the spring, and this is generally done during manual film advance or by preliminary shutter release button movement. The greater the amount of energy needed to power the generator, the more physical effort is demanded from the operator.

In co-assigned British Pat. No. 1,365,560, which issued on Jan. 2, 1975 to D. M. Harvey and G. M. Inglis, a generator-powered electronic shutter mechanism is disclosed which overcomes many of the problems associated with both battery-powered systems and spring-loaded generator armatures. That shutter mechanism is arranged to terminate an exposure in response to a control signal derived from an electronic trigger circuit. The source of energy for the electronic trigger circuit comprises an electric pulse generator which includes a permanent magnet and a coil which lies in the magnetic field. Upon actuation of the shutter release, the coil moves in the field to induce an electromotive force.

While the Harvey et al mechansim operates well for its intended purpose and overcomes many of the problems associated with battery and spring-loaded generator armature-powered exposure control systems, it comprises relatively large masses which are required to move during shutter run-down, which might result in camera movement and/or noisy operation.

SUMMARY OF THE INVENTION

In accordance with the present invention, there is provided an exposure control mechanism which is controlled by an electronic circuit which produces a signal having a characteristic which is a function of scene illumination. Electrical energy for powering the electronic circuit and/or mechanical energy for causing the shutter mechanism to terminate exposure is derived from piezoelectric energy conversion devices.

As energy supply means for powering exposure control systems, piezoelectric devices are more reliable than battery sources and more efficient than other non-battery powered sources known in the prior art. Piezoelectric devices have very little resistive loss, and may operate at electro-mechanical conversion efficiencies as high as about 50%. As motors, piezoelectric devices are extremely fast acting and therefore permit very accurate timing while operating at low energy levels. They can retain mechanical members in a displaced position without substantial power drain; also, theoretically, they have an infinite lifetime.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to.

DESCRIPTION OF THE PREFERRED EMBODIMENT

Figure 1:
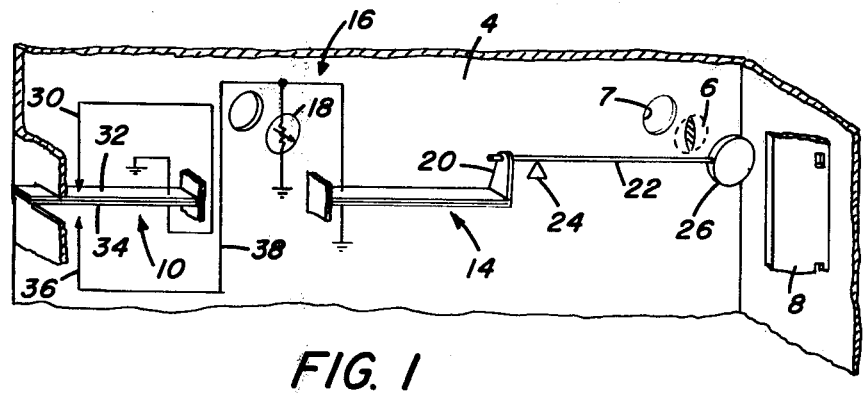
FIGS. 1 and 2 of the accompanying drawings which are schematic views of a portion of a camera in accordance with a preferred embodiment of the present invention, each figure showing the camera in a different stage of operation.

Piezoelectricity is a well known phenomenon exhibited by certain crystals, and its discovery dates back to the work of Pierre and Paul-Jacques Curie in 1880. In brief, when such crystals are compressed or extended in particular directions, electric charges of opposite signs are produced at opposite ends of the crystal. Not only is an electric moment induced in piezoelectric crystals by an application of mechanical stress or strain, there is also a converse effect; namely, on applying an electric field, the crystal changes shape by expansion in one direction and contraction in another. A fuller discussion of the direct and converse effects may be found in ENCYCLOPAEDIC DICTIONARY OF PHYSICS, Pergamon Press, 1962, pages 503–505.

A bimorph, or bimorph cell, is a member composed of two strips of piezoelectric material joined together (such as by cement) with the direction of expansion of one strip aligned with the direction of contraction of the other such that the application of an electric potential to both strips causes one to expand and the other to contract, thus producing a bending of the combination in a manner analogous to the curling of a bimetallic strip due to differential expansion when heat is applied. Until the potential difference is removed, the bimorph will remain bent. If a bimorph is physically bent, an electric potential difference tending to return the bimorph to its original configuration will develop from one strip to the other strip. That potential difference will remain until either the potential is externally removed or the bimorph is unflexed. If the bimorph is bent and the originally created potential difference dissipated, such as by shorting or through a load, the unbending of the bimorph by external force or its own internal spring force will produce an electric potential of a polarity opposite to that of the original potential produced when the bimorph was first bent. The potential will resist the forces (e.g., internal spring force) tending to return the bimorph to its original configuration.

The figures illustrate the operating principal of a camera incorporating a preferred embodiment of our invention. Because cameras are well known, the present description will be directed in particular to elements forming part of, or cooperating more directly with, the present invention. Camera elements not specifically shown or described may take various forms well known to those skilled in the art.

The camera, which includes a housing 4 and a lens 6 behind aperture 7, is adapted to receive photographic film 8. A bimorph 10, to be used as a generator, is fixed at one end to the camera housing 4 in cantilever fashion, and is interconnected electrically to a similarly mounted bimorph motor 14 by a circuit 16 which includes a photoresponsive element 18 such as for example a CdS cell aligned with an aperture 19 in housing 4. Bimorph motor 14 is flexibly attached at 20 to an arm 22 which is pivotally mounted at 24 and carries a shutter blade 26 normally aligned with the camera's taking lens 6 and aperture 7.

Figure 2:
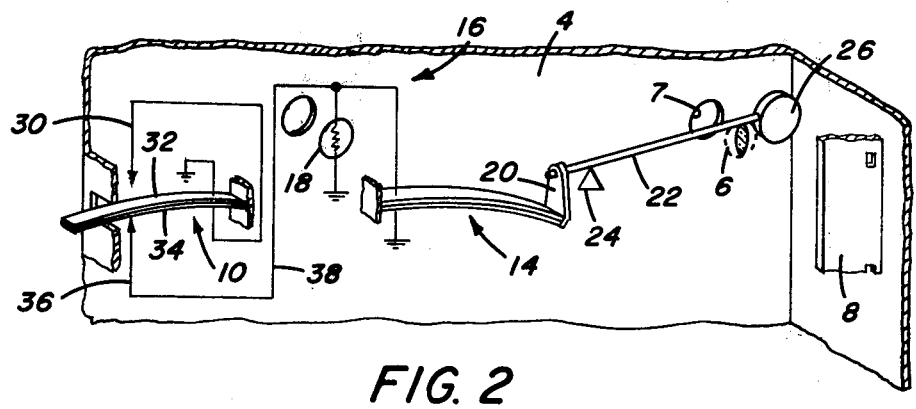

In operation, bimorph generator 10 is manually depressed to the position shown in FIG. 2, which sequentially opens contact 30, causes a voltage potential of a predetermined polarity to be developed across plates 32 and 34 of the generator and brings lower plate 34 into engagement with electrical contact 36. The voltage across bimorph generator 10 is thus transferred via connector 38 to bimorph motor 14, which is arranged such that the voltage polarity applied thereto will cause the upper strip of bimorph 14 to expand along the length of the bimorph and the lower strip to contract in that direction. Thus the bimorph will bend as shown in FIG. 2 and thereby displace the free end of the motor downwardly. As bimorph motor 14 bends, it causes arm 22 to rotate about pivot 24 to begin the exposure period by moving shutter blade 26 to its FIG. 2 position to uncover aperture 7.

Upon releasing manual pressure on bimorph generator 10, the generator and bimorph motor 14 will remain in their displaced, FIG. 2 positions as long as the voltage remains across the bimorph plates. However, that voltage immediately begins to discharge through CdS cell 18 and both bimorphs begin to return to their initial positions. Therefore, the time for which the exposure aperture is uncovered is a function of the electrical signal on bimorph 14 as determined by the electrical conductivity of CdS cell 18 (a function of the intensity of light incident thereon). As bimorph generator 10 returns almost to its initial position, it engages contact 30 somewhat before reaching its unflexed condition, thereby shorting the bimorph to cause it to return completely to its initial position.

We have found that shutters built in accordance with the present invention exhibit a broad dynamic range capability. In one version, such a shutter was capable of speeds from 1/500 to 500 seconds (almost 18 stops) with an error of no more than $\pm\frac{1}{2}$ stop through its entire range of operation. Further, shutters in accordance with the invention are not limited to this speed range, but are capable of slower and faster speeds.

If desired, a double-exposure-prevention mechanism can readily be provided so that once closed, shutter blade 26 cannot be re-opened until the film has been advanced. Many such mechanisms will occur to those skilled in the art, such as for instance, use of a switch to open connector 38 after exposure and close upon film advance.

Electrical contacts 30 and 36 are illustrated for ease of description. However, these contacts could be replaced by a large resistor and a diac, respectively, so that problems common to electrical contacts (such as wear and dirt) could be avoided. A diac is a well known electronic component which normally exhibits very high electrical resistance but which will break down at a predetermined voltage so as to exhibit low resistance thereafter. Before the diac breaks down, its resistance is much higher than that of the resistor and therefore approximates an open circuit. After the diac has broken down, it will have an extremely low resistance relative to the resistor, the latter of which will thereupon approximate an open circuit.

The invention has been described in detail with particular reference to a preferred embodiment thereof, but it will be understood that variations and modifications can be effected within the spirit and scope of the invention.

We claim:

1. For use in photographic apparatus of the type having means for imagewise exposing a photosensitive material, apparatus for controlling the exposure of such material, said apparatus comprising: (a) a photoelectric exposure control circuit for controlling the exposure of a photosensitive material in accordance with ambient lighting conditions, said circuit comprising a piezoelectric motor for storing electrical energy and a photocell, positioned to be illuminated by ambient light, for dissipating energy stored by said piezoelectric motor at a rate determined by the ambient light level, said rate controlling the exposure of the photosensitive material; and (b) a piezoelectric generator for energizing said circuit.

2. In a camera of the type having an exposure aperture and a shutter mechanism movable between an open and a closed position; the improvement comprising:
   piezoelectric generator means for producing an electrical charge when stressed;
   a charge storage device comprising a piezoelectric motor;
   means for electrically connecting said storage device and said generator means in a manner such that stressing said generator means creates an initial charge on said storage device;
   photoresponsive circuit means for dissipating charge on said storage device at a rate which is a function of the level of scene illumination; and
   means, responsive to the charge on said storage device having dissipated to a predetermined level, for controlling movement of said shutter mechanism from its open to its closed position.

3. In a camera of the type having (1) an exposure aperture, (2) electrically energizable photoelectric circuit means including a photoresponsive cell for producing a signal having a characteristic which varies as a function of scene luminance, and (3) a shutter movable between an aperture opening position and an aperture closing position to define an exposure period; the improvement comprising:
   piezoelectric motor means responsive to the signal from the electric circuit for opening and closing the shutter in accordance with the signal characteristic, said piezoelectric motor comprising a bimorph on which said circuit is adapted to place an initial charge, said bimorph being adapted to move the shutter to an aperture opening position in response to being subjected to the initial charge, said photoresponsive cell being adapted to dissipate charge from said bimorph at a rate proportional to the level of illumination incident upon said cell to allow movement of said shutter to an aperture closing position.

4. The invention defined by claim 3 wherein said photoelectric circuit means is energized by a piezoelectric generator.

5. The invention defined by claim 4 wherein said piezoelectric generator comprises a bimorph.

* * * * *